United States Patent
Kipp (10) Patent No.: US 11,313,949 B2
(45) Date of Patent: Apr. 26, 2022

(54) FREQUENCY DEPENDENT RADAR CROSS SECTION MODEL FOR REAL-TIME RADAR SIMULATION IN A DYNAMIC ENVIRONMENT

(71) Applicant: ANSYS, INC., Canonsburg, PA (US)

(72) Inventor: Robert A. Kipp, Hinsdale, IL (US)

(73) Assignee: ANSYS, INC., Canonsburg, PA (US)

( * ) Notice: Subject to any disclaimer, the term of this patent is extended or adjusted under 35 U.S.C. 154(b) by 352 days.

(21) Appl. No.: 16/511,973

(22) Filed: Jul. 15, 2019

(65) Prior Publication Data
US 2021/0018594 A1    Jan. 21, 2021

(51) Int. Cl.
G01S 7/41    (2006.01)
G01S 7/40    (2006.01)
G01S 13/931  (2020.01)

(52) U.S. Cl.
CPC ............ G01S 7/412 (2013.01); G01S 7/4052 (2013.01); G01S 13/931 (2013.01)

(58) Field of Classification Search
CPC ....... G01S 7/412; G01S 7/4052; G01S 13/931
See application file for complete search history.

(56) References Cited

U.S. PATENT DOCUMENTS

| | | | | |
|---|---|---|---|---|
| 6,114,985 A | * | 9/2000 | Russell | G01S 7/4052 342/169 |
| 6,580,388 B1 | * | 6/2003 | Stoyanov | G01S 7/411 342/192 |
| 7,424,408 B1 | * | 9/2008 | Crabtree | G01S 7/4052 434/38 |
| 8,242,952 B1 | * | 8/2012 | Barr | G01S 7/412 342/90 |
| 2010/0066592 A1 | * | 3/2010 | Lee | G01S 7/4021 342/175 |
| 2010/0109941 A1 | * | 5/2010 | Vacus | G01S 7/41 342/179 |
| 2020/0158855 A1 | * | 5/2020 | Blanche | G01S 13/9023 |

FOREIGN PATENT DOCUMENTS

| | | | | | |
|---|---|---|---|---|---|
| JP | 2005181153 A | * | 12/2003 | ............... | G01S 7/40 |
| JP | 2005181153 A | * | 7/2005 | ............... | G01S 7/40 |

* cited by examiner

*Primary Examiner* — Donald H. B. Braswell
(74) *Attorney, Agent, or Firm* — Womble Bond Dickinson (US) LLP (57) ABSTRACT

A method for building a coherent radar cross-section (RCS) model database for real-time dynamic simulation of range-Doppler radars is disclosed. The database may be used with radar sensors that employ different waveforms. A pre-processing operation before the dynamic simulation performs fast Fourier Transforms (FFTs) to interpolate the target frequency responses from the database to match the frequency samplings of the radar used in the dynamic simulation. The method determines the frequency responses of the targets to a reference chirp in a coherent processing interval (CPI) and the radial velocities of the targets relative to the radar at the time of the reference chirp. The method extrapolates, using FFTs, the frequency responses of the targets to the reference chirp across the velocity dimension based on the relative radial velocities to determine the frequency responses of the targets to the other chirps across the CPI, reducing the computational burden for the simulation.

18 Claims, 9 Drawing Sheets

FREQUENCY DEPENDENT RADAR CROSS SECTION MODEL FOR REAL-TIME RADAR SIMULATION IN A DYNAMIC ENVIRONMENT

BACKGROUND

Many target ranging, detection, or identification applications involving simulation of range-Doppler radars looking into the environment require the ability to predict range-Doppler imagery as quickly as the real radar would generate them (e.g., 30 frames-per-second). One such application is simulating autonomous vehicles equipped with radar sensors in a closed loop that includes target classification, decision making, and vehicle dynamics. Frequently, there is a need to include real hardware for some elements of the closed loop simulation (known as hardware in-the-loop, HiL), which typically means all simulation components must operate in real time. Thus, radar sensor models that can predict radar responses and imagery of targets in real-time for closed-loop radar simulation is often needed.

The requirement for real-time prediction capability has spurred the development of simplified models for radar/environment interaction. These simplified models may sacrifice real-world physics and realism of predictions for speed. One such model is the Rotated Range Profile Reduced-Order Model (RRP-ROM). One drawback with RRP-ROM is that the radar model database of targets (e.g., vehicles) built is dependent on the sensor design and sensor placement. If the radar/sensor design or placement height changes, the model database would have to be rebuilt. While there have been attempts to introduce a model database of targets that may be used with multiple radar sensors by interpolating the frequency responses of objects in the database to the particular sampling frequencies of the radar sensors in the dynamic simulation, there are limitations. For example, some of the interpolation schemes introduce significant range (time-domain) artifacts that degrade the simulation results while others require a much higher frequency sampling density in the database, which may substantially increase database storage and synthesis time by roughly an order of magnitude. Thus, there is a need for a radar/environment interaction prediction model that operates in real-time with enhanced realism, is memory efficient, and is also capable of being built once and re-used for many different types of radar waveforms, antennas, and placements.

SUMMARY

The disclosure describes a method to capture the radar scattering effects of individual objects (e.g., road vehicles) such as in a radar cross-section (RCS) model of the objects using a level of abstraction that leaves the radar's antennas and particular frequency-sampling out of the model. The models are used to build a compact database that preserves objects' time-distributed radar responses, including delayed responses due to multi-bounce. The database may be used with multiple radar sensors that employ different waveforms, frequency bands, or that may be positioned at different locations on a moving platform or vehicle located within the same environment as the objects in a dynamic simulation. In one embodiment, a pre-processing operation before the dynamic simulation performs fast Fourier Transforms (FFTs) to interpolate the object frequency responses from the database to the particular frequency samplings of the radar sensors used in the dynamic simulation, where the frequency sampling of a radar sensor may be the frequency sampling that allows an analysis or a simulation to capture the functional and operational behavior of the radar sensor in the frequency domain. The frequency sampling of a radar sensor may be either explicitly specified within the radar design or implicitly determined from a frequency-domain representation that is sufficient to represent the periodic waveform and signal processing of the radar. Using FFTs to interpolate the frequency response of an object to obtain a coherent RCS model of the object that matches the frequency sampling of a radar sensor overcomes the limitations of conventional interpolation scheme such as significant range (time-domain) artifacts (e.g., "ghost" signature features) that degrade the simulation results or the requirement for higher frequency sampling density and the resulting larger database storage and longer database synthesis time.

In one embodiment, a method for building a model database in preparation for a dynamic simulation of range-Doppler radars includes receiving a computer aided design (CAD) of a target. The method generates a coherent RCS model of the target based on the CAD model, the coherent RCS of an object being the phasor quantity representing the characteristic scattering response of the object to an incident electromagnetic plane wave for a particular combination of incidence angle, observation angle, incident polarization, observation polarization, and frequency, and whose magnitude squared equals the formal RCS of the object. The RCS model includes the frequency response of the target to a range of frequencies and a range of sweeping angles of radar signals. The coherent RCS model is generated for all four polarization combinations of horizontal and vertical polarization of the incident and reflected fields of the radar signals. The method stores the coherent RCS model of the target for the range of frequencies and the range of sweeping angles for all four polarization combinations as a far-field RRP-ROM (FF-RRP ROM) for the target in a database that may be used with different radar sensors in a real-time dynamic simulation of the target and the radar sensors.

The disclosure also describes a method to use the FF-RRP ROM database of targets to predict in real-time what a radar sensor will observe as these targets move in its field of view during real-time dynamic simulation. In one embodiment, the method determines the frequency responses of the targets to a center radar chirp (or pulse) in a coherent processing interval (CPI) as well as the radial velocities of the targets relative to the radar at the time of the center chirp. The method extrapolates, using FFTs, the frequency responses of the targets to the center chirp across the velocity dimension based on the relative radial velocities to determine the frequency responses of the targets to the other chirps before and after the center chirp across the CPI. Using the FFTs to determine the frequency responses of the targets to the multitude of chirps across the CPI based on the frequency response and the instantaneous velocity of an object relative to the radar sensor at the center chirp eliminates the computational burden to directly compute the frequency responses of the targets to a multitude of chirps across the CPI, enabling real-time simulation of the radar responses of the objects.

In one embodiment, a method of a dynamic simulation of range-Doppler radars includes receiving a coherent RCS model for a target. The coherent RCS model includes the frequency responses of the target to a multitude of radars, including the frequency responses of the target to a range of frequencies and a range of sweeping angles for all four polarization combinations of incident and reflected fields. The method interpolates the frequency responses of the RCS model to obtain an updated RCS model of the target matching the frequency sampling of a radar. The method computes the frequency response of the target to a center chirp within a CPI of the radar. The method computes the radial velocity of the target relative to the radar at the center chirp within the CPI. The method extrapolates the frequency response of the target to the center chirp based on the relative radial velocity to determine the frequency responses of the target to a multitude of chirps of the radar within the CPI. The method presents the frequency responses of the target for the dynamic simulation.

BRIEF DESCRIPTION OF THE DRAWINGS

The present disclosure is illustrated by way of example and not limitation in the figures of the accompanying drawings, in which like references indicate similar elements and in which.

DETAILED DESCRIPTION

A technique is disclosed to model the radar scattering effects of targets at a high level of abstraction so that the model may be used with multiple radars that employ different waveforms, frequency bands, or that may be positioned differently on moving vehicles. The high level of abstraction removes a particular radar's antennas and frequency sampling from the model and instead captures the frequency response of the target as a coherent radar cross-section (RCS) model in four incident and observed polarization combinations. The model may be referred to as a far-field rotated range profile reduced-order model (FF-RRP ROM). The technique may build a database of models for different targets. The database of FF-RRP ROMs of targets may be frequency re-sampled using FFT-based interpolation to determine the frequency responses of the targets to the frequency sampling of each radar in a pre-processing operation for a real-time dynamic simulation of the targets and the radar sensors.

A technique is disclosed to use the FF-RRP ROM database of targets to predict in real-time the frequency responses of the targets to the radar sensors as the targets move in the field of view of the radar sensors during dynamic simulation. To reduce the computational burden so that real-time dynamic simulation is enabled, the technique determines the frequency responses of the targets to a center radar chirp in a coherent processing interval (CPI) as well as the radial velocities of the targets relative to the radar sensors, which may also be referred to as the instantaneous Doppler velocities of the targets, at the time of the center chirp. The technique extrapolates from the center chirp to the other chirps of the CPI using over-sampled relative radial velocity bins and FFT and IFFT processing, providing acceleration over brute-force chirp-by-chirp computation.

Figure 1A:
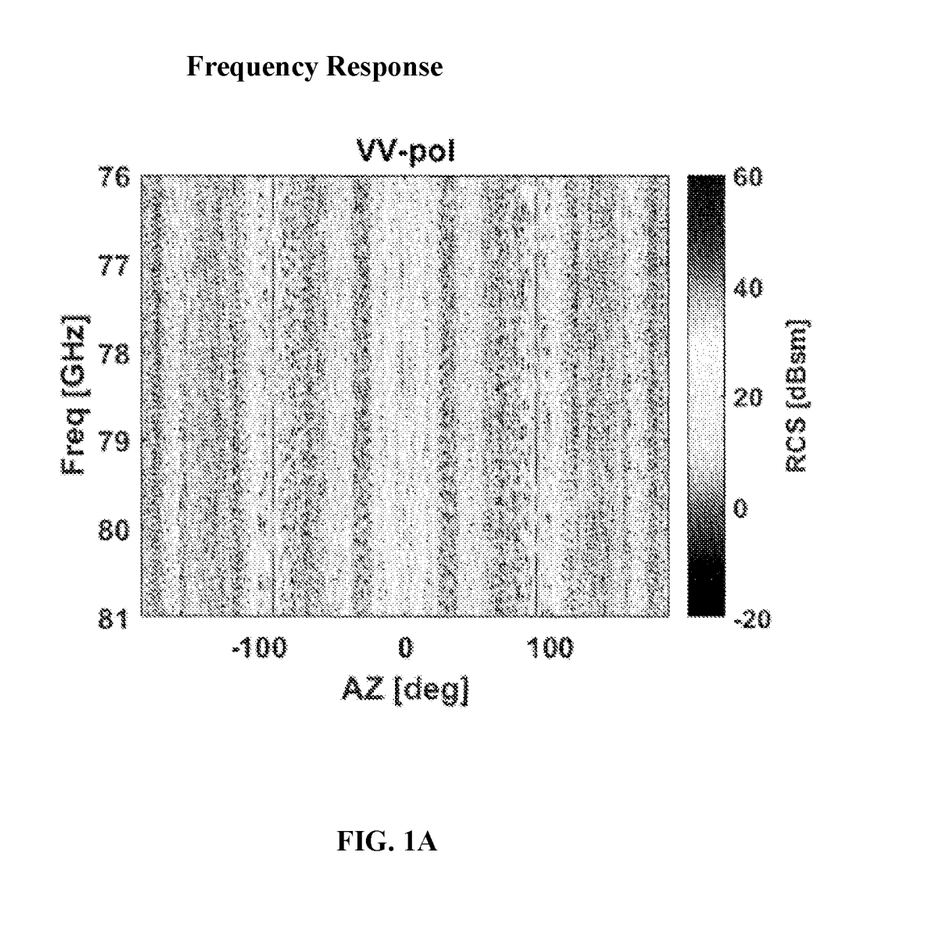
FIG. 1A illustrates a frequency response of a target to a frequency sweep and a horizontal angular sweep of an electromagnetic plane wave for a target modeled in far-field rotated range profile reduced-order model (FF-RRP ROM) in accordance with one embodiment of the disclosure.

FIG. 1A illustrates a frequency response of a target to a frequency sweep and a horizontal angular sweep of an electromagnetic plane wave for a target modeled in FF-RRP ROM in accordance with one embodiment of the disclosure. The frequency response of the target represents the coherent, monostatic radar cross-section (RCS) of the target in the 76-81 GHz band and with incident azimuth angles ranging from −180 degrees to +180 degrees for a vertically polarized incident field that produces a reflected field observed in a vertical polarization (VV). The RCS is monostatic to cover the scenario in which the incident angle and the observation angle relative to the target are the same. In other embodiments, the RCS may be bistatic when the incident angle and the observation angle relative to the target may be different. The grayscale of the frequency response covers the range of RCS of the target from −20 dBsm to 60 dBsm, where dBsm is 10 times the base-10 logarithm of the linear RCS magnitude in units of square meters. For example, tracing a vertical line at a selected azimuth angle shows the log-scale monostatic RCS of the target from 76-81 GHz for the VV polarization combination for the selected azimuth angle. The frequency response is independent of the antennas and the particular frequency sampling of a radar giving rise to an incident plane wave in the vicinity of a target to yield a reduced order model that is broadly applicable to different radar designs instead of being specialized to a single design. The frequency response shows the magnitude component of a coherent RCS model when the incident field (from the radar to the target) is vertically polarized and the reflected field (to the radar from the target) is observed in the vertical polarization.

To generate the RCS model of an object, a database preparation operation imports a 3D CAD-model representation of the object (e.g., vehicle) into an electromagnetic simulation tool for simulating the monostatic RCS of the object over a wide range of angles and frequencies. For efficiency, a tool implementing a ray-tracing technique such as shooting-and-bounce rays (SBR) may be used. In one embodiment, the electromagnetic simulation tool may be the high frequency structure simulator (HFSS) from ANSYS. In another embodiment, other simulation methodologies or tools may be used. The tool applies material treatments such as metal, plastic, rubber, glass, etc., to the 3D representation of the object and delivers both the magnitude and the phase of the RCS of the object.

In one embodiment, the tool sets up a uniform simulation frequency sweep that is sufficiently wide to cover the radar bands of all potential radar sensors to be used during the dynamic simulation execution stage, and with sufficient frequency sampling density to prevent time (range) response aliasing. In one embodiment, the minimum frequency density is proportional to the largest linear dimension of the object (e.g., 4-5 m for a car, more for a truck). The frequency sweep for sensor-independent application may be large enough to cover radars that typically operate in the 76-81 GHz band.

In one embodiment, the tool set ups up a uniform angular sweep about the object that is sufficient to cover all pose angles of the object relative to a radar sensor. In one embodiment, a 360° horizontal sweep about the object with 1° spacing is used. The simulation computes the coherent frequency response to the RCS of the object as a function of the angle and the frequency of an incident plane wave over the covered ranges for all four polarization combinations of the incident and reflected fields: vertically polarized incident field producing reflected field observed in vertical polarization (VV), vertically polarized incident field producing reflected field observed in horizontal polarization (HV), horizontally polarized incident field producing reflected field observed in vertical polarization (VH), and horizontally polarized incident field producing reflected field observed in horizontal polarization (HH). The results for the object are exported and stored as the FF-RRP ROM of the object in a target database of objects for retrieval during dynamic simulation. FIG. 1A shows the magnitude of the frequency response of a pickup truck for the VV polarization covering the 76-81 GHz frequency bands and the azimuth angle of −180° to 180° for the pose angle of the truck relative to the radar sensor.

Figure 1B:
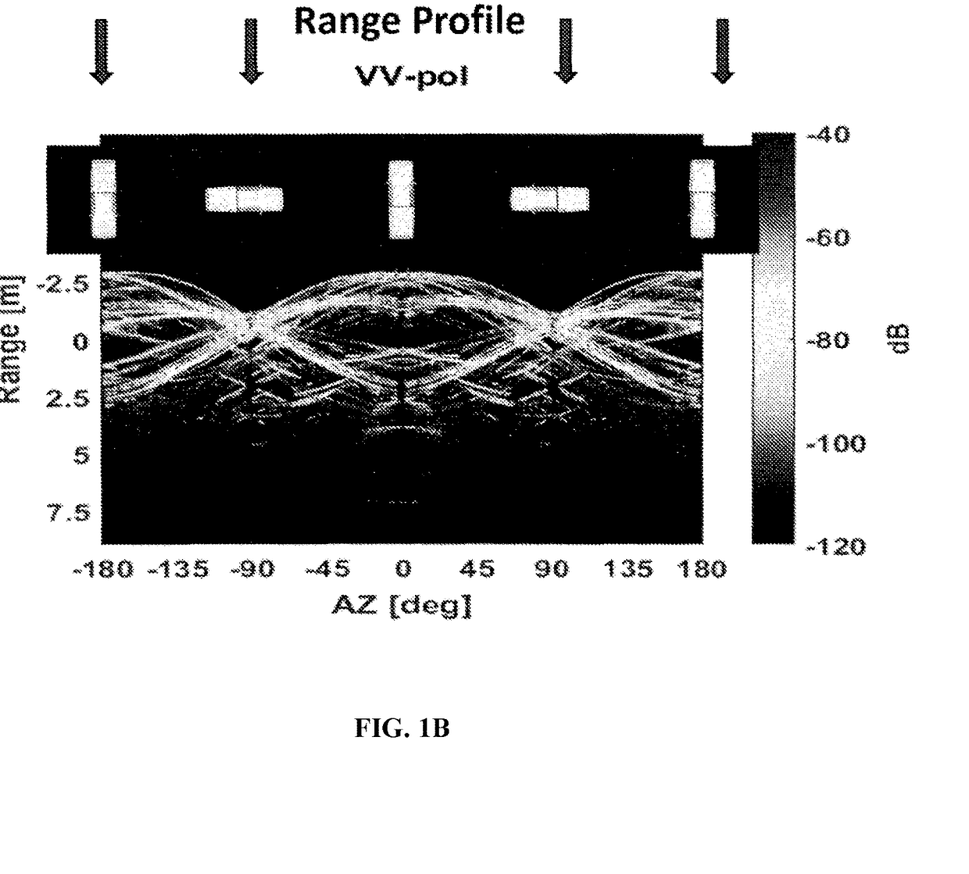
FIG. 1B illustrates a multitude of range profiles of a target across a range of azimuth angles showing the time-distributed radar responses as a function of range and azimuth angle for VV polarization in accordance with one embodiment of the disclosure.

FIG. 1B illustrates a multitude of range profiles of a target across a range of azimuth angles showing the radar responses as a function of range and azimuth angle for VV polarization in accordance with one embodiment of the disclosure. The target is the pickup truck of FIG. 1A. FIG. 1B may be derived from the magnitude and phase of the frequency response of the truck as a function of a horizontal angular sweep of a radar such as shown just for magnitude in FIG. 1A using inverse FFT across frequencies for each azimuth angle. The different pose angles of the truck with respect to the radar sensor are shown, with an azimuth angle of 0° corresponding to the radar sensor directly in front of the truck. A reference point on the truck is selected to correspond to the range of 0. FIGS. 1A and 1B both show that the scattering effect of the truck for VV polarization is strongest when the radar a looking broadside to the truck at azimuth angle +/−90 degrees.

Figure 2:
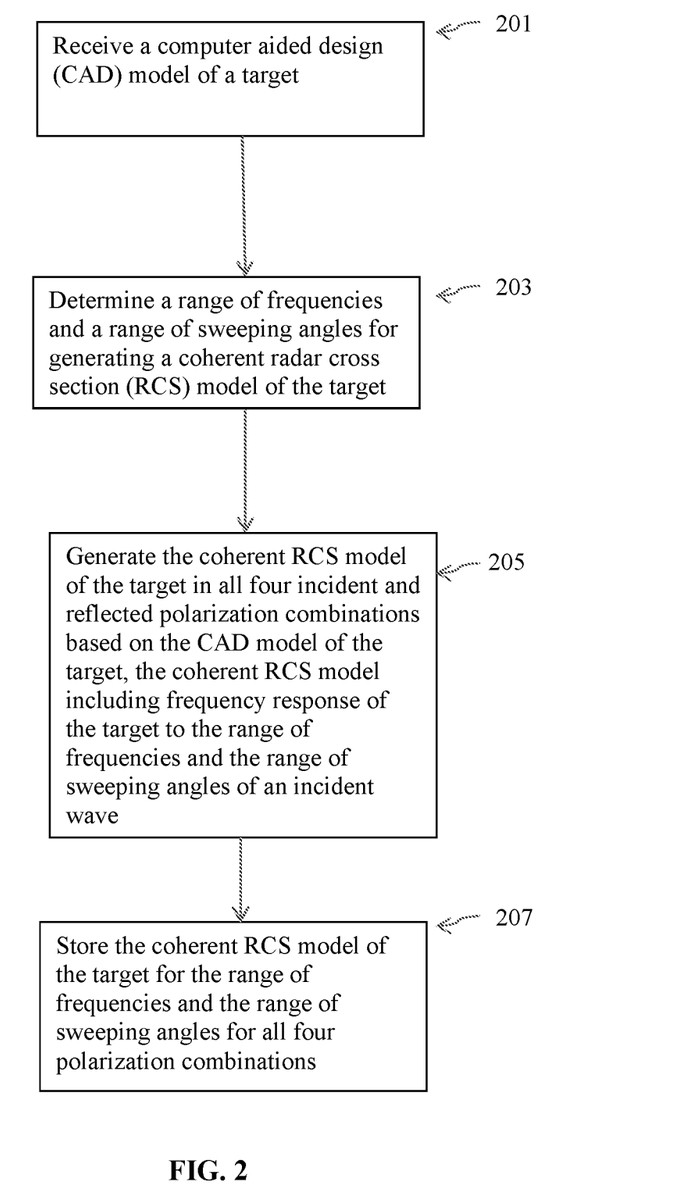
FIG. 2 is a flow diagram of a method to capture the radar scattering effects of a target modeled in FF-RRP ROM that may be used by multiple radar sensors in accordance with one embodiment of the disclosure.

FIG. 2 is a flow diagram of a method to capture the radar scattering effects of a target modeled in FF-RRP ROM that may be used by multiple radar sensors in accordance with one embodiment of the disclosure.

In operation 201, the method receives a CAD representation of a target into an electromagnetic simulation tool for predicting the coherent RCS of the object over a wide range of angles and radar frequencies. In operation 203, the method determines a range of frequencies and a range of sweeping angles for generating the coherent RCS model of the object. In one embodiment, a frequency resolution of the range of frequencies (e.g. an amount of difference between two adjacent frequencies in the coherent model) may be based on the longest linear dimension of the object. The range of frequencies to be sampled at this frequency resolution may be based on the radar sensors likely to be used, as determined by regulatory constraints or international standards. For example, FCC or its international equivalent allows automotive radar to operate from 76-81 GHz in the so-called 77 GHz automotive radar band. In one embodiment, the method may set up a uniform simulation frequency sweep that is sufficiently wide to cover the radar bands of all potential radar sensors to be used during the dynamic simulation execution stage, and with sufficient frequency sampling density to prevent time (range) response aliasing. The method may set up a uniform angular sweep about the target that is sufficient to cover all pose angles of the target relative to the radar sensors.

In operation 205, the method generates a coherent RCS model of the target for all four incident and reflected polarization combinations (VV, VH, HV, HH) based on the CAD representation of the target, which CAD representation is understood to contain both a 3D geometrical and materials description of the target. The coherent RCS model comprises the scattered-field response of the target to an incident electromagnetic plane-wave issued over the range of frequencies and the range of sweeping angles.

In operation 207, the method stores the coherent RCS model of the target for the range of frequencies and the range of sweeping angles for all four polarization combinations as an FF-RRP ROM of the target into a database of targets for retrieval during dynamic simulation. The FF-RRP ROM of the target is independent of the antennas and the frequency sampling of a particular radar sensor and may be broadly applicable to different radar designs and different placements of the radar designs on a vehicle.

Before performing the dynamic simulation using the FF-RRP ROM, a pre-processing operation may identify the specifications of all radar sensor devices and radar modes to be used in the dynamic simulation. In one embodiment, the specifications include polarized 3D antenna patterns, antenna positioning and spacing, transmission power, Tx/Rx channel combinations, and waveforms. There are many types of radar waveform. In one embodiment, for a chirp-sequence frequency modulated continuous waveform (FMCW), its specifications may include center frequency, bandwidth, chirp duration, chirp interval, and chirp sampling rate. If the radar sensor processes a sequence of pulses or chirps across a coherent processing interval (CPI) to measure Doppler velocity, the specification may include the CPI duration and number of chirps. In one embodiment, for multi-mode radars, the start delay of each mode relative to the start of the sensor frame may also be specified.

The pre-processing operation may load the FF-RRP ROM of each vehicle or object in a dynamic radar sensor simulation from the database. For each radar sensor device mode and waveform, the pre-processing operation may interpolate the stored frequency response from the database to match the frequency sampling of the radar mode, holding these interpolated results in memory for the duration of the dynamic simulation. Performing the interpolation using an FFT-based algorithm to increase frequency sampling density avoids introducing early or late time response artifacts that would otherwise occur with more conventional interpolation algorithms (e.g., linear or spline interpolation).

In one embodiment of the FFT-based interpolation of the frequency response of the FF-RRP ROM of an object, the pre-processing operation may apply a window function to the frequency response to suppress sidelobes introduced during the interpolation. In one embodiment, the window function used may be one that will be used in post-processing final simulation results, such as ones used when converting radar responses into range-Doppler velocity imagery. The pre-processing operation may convert the windowed frequency response of the FF-RRP ROM into time domain using IFFT. The pre-processing operation may zero-pad the time-domain response. The size of the zero-padded response divided by the size of the time-domain response before the zero-padding may be selected to match a desired oversampling ratio or a desired frequency sampling density of the radar device. The pre-processing operation may convert the zero-padded time response back into the frequency domain using FFT. The pre-processing operation may un-apply the window function to the re-sampled frequency response. If the re-sampled frequency response after the window function is un-applied has higher frequency sampling density than that of the radar, the pre-processing operation may use linear interpolation to obtain a frequency response whose frequency sampling density matches that of the radar. In one embodiment, if the frequency response of the FF-RRP ROM of the object already has a frequency sampling density that is already higher than that of the radar, then the pre-processing operation may simply linearly interpolate the frequency response of the FF-RRP ROM to obtain the re-sampled frequency response.

The pre-processing operation may create a 2D array to hold the received signal response vs. frequency vs. relative radial velocity for each Rx antenna of each radar mode (i.e., for each Tx/Rx channel pair). The 2D array of target frequency response vs. relative radial velocity, or simply referred to as velocity, supports time extrapolation of responses across the radar CPI during dynamic simulation to reduce computational burden as will be shown. In one embodiment, the dimension of the velocity of this array is over-sampled at least 4× relative to the velocity resolution implied by each radar mode's CPI and spans all possible radial (Doppler) velocities the radar-bearing vehicle will encounter relative to targets in the scene throughout the simulation. Oversampling the velocity of targets encountered by the radar-bearing vehicle by 4X relative to the Doppler velocity resolution of each Tx/Rx channel pair controls the processing noise of the described algorithm.

After the completion of the pre-processing operation, execution of the dynamic simulation may start by updating the coordinate systems and linear velocities of all objects for the current time step in simulation, including the radar-bearing "Ego" vehicle and other targets in the scene. For each radar mode, the dynamic simulation may adjust the updated coordinate system to predict the positions of the objects at the local time corresponding to the center of each mode's CPI. The dynamic simulation may use the known linear velocities of the objects to make small adjustments to the objects. In particular, the adjustment should be based on the time when the central chirp or pulse of the CPI is issued by the Tx antenna. The adjustment made to each vehicle advances the vehicle to its position at the center chirp of the radar CPI. In one embodiment, the adjustment made to each vehicle may be based on the time of a chirp other than the central chirp, such as the first chirp, the last chirp, or another chirp in the CPI. However, using the central chirp as the reference may minimize error in the (I)FFT-based extrapolation for a given level of over-sampling.

The dynamic simulation may update the Ego vehicle coordinates and velocity to update the coordinates and velocities of each radar device and its antennas at the center chirp of the CPI. In one embodiment, the Ego vehicle and the radar device may be updated with respect to a chirp other than the center chirp to correspond to the same chirp referenced by the target vehicles. The dynamic simulation may reset the 2D arrays of Rx signal vs. frequency vs. relative radial velocity for each Tx/Rx channel pair that was setup during the pre-processing operation.

For each target and Tx/Rx channel pair, the dynamic simulation may determine the vector antenna gains of the Tx and Rx antennas in the direction of each target. In one embodiment, this may be based on the polarized 3D patterns of the antennas. The dynamic simulation may compute the angles from the Tx and Rx antennas to each target and may use the computed angles to look up the vector antenna gains of the antennas to determine the vector antenna gain for the Tx and Rx antennas for each target. In one embodiment, the dynamic simulation may use a computed angle to look up the two nearest angles in the vector antenna gains of a Tx or Rx antenna for a target and then apply a linear interpolation between the two nearest angles to yield a vector antenna gain for the computed angle. The weighting may be based on the angular distance from the computed angle to the two nearest angular samples. In one embodiment, the dynamic simulation may use a computed angle to look up N neighboring angles in the vector antenna gains of a Tx or Rx antenna for a target and then apply a higher-order interpolation function among the N neighboring angles to yield a vector antenna gain for the computed angle.

For each target and each Tx/Rx channel pair, the dynamic simulation may determine the angle from the target to the mid-point between Tx and Rx antennas. The dynamic simulation may use this angle to look up the nearest FFT-interpolated frequency response in the coherent RCS model of the target for the four polarization combinations (VV, HV, VH, HH) for each radar mode that was generated during the simulation pre-processing operation. In one embodiment, the dynamic simulation may use the angle to look up the two nearest angles in the FFT-interpolated frequency response and then apply a linear interpolation between the two nearest angles to yield an FFT-interpolated frequency response for the desired angle. The weighting may be based on the angular distance from the desired angle to the two nearest angular samples. In one embodiment, the dynamic simulation may use the angle to look up N neighboring angles in the FFT-interpolated frequency response and then apply a higher-order interpolation function among the N neighboring angles to yield an FFT-interpolated frequency response for the desired angle. For each target and Tx/Rx channel pair, the dynamic simulation may compute the distances from the Tx antenna and Rx antenna to the target. The dynamic simulation may determine the received signal frequency response by scaling the interpolated frequency response in the coherent RCS model of the target according to the Tx antenna vector gain, the Tx radiation power, the distance from Tx to target, the Rx vector gain, and the distance from Rx to the target. The phase progression of the frequency response may precisely incorporate the round-trip path from the Tx antenna to the target to the Rx antenna. The polarized RCS data for the four polarization combinations (VV, HV, VH, and HH) may be combined with the polarized (vector) gains of the Tx and Rx antennas to yield a scalar frequency response of the target to the center chirp of the radar CPI.

The dynamic simulation may determine the vector linear velocity of the target relative to the Tx/Rx antenna pair. Using this information and the direction from the Tx/Rx antenna pair to the target, the dynamic simulation may determine the time rate of change in the round-trip path length from the Tx antenna to the target to the Rx antenna at the center chirp of the radar CPI. This time rate of change of the distance between the Tx/Rx antenna pair and the target may be referred to as the relative radial velocity or the instantaneous Doppler velocity of the target. For each target and Tx/Rx channel, the dynamic simulation may accumulate the Rx signal scalar frequency response into the 2D array of Rx signal vs. frequency vs. velocity, using the instantaneous Doppler velocity of the target to select the nearest velocity bin. In one embodiment, the two nearest velocity bins to the instantaneous Doppler velocity of the target is identified. The dynamic simulation may accumulate the Rx signal scalar frequency response into the two neighboring velocity bins using a linear weighting based on the difference between the instantaneous Doppler velocity and the velocity at the center of the respective neighboring velocity bins. In another embodiment, the N nearest velocity bins to the instantaneous Doppler velocity of the target are identified. The dynamic simulation may distribute and accumulate the Rx signal scalar frequency response into the N neighboring velocity bins using a higher-order weighting function. Each 2D array will accumulate the frequency responses across all targets to the center chirp of the radar CPI for a Tx/Rx pair of a radar mode. Hence, targets may be looped within each Tx/Rx channel pair while frequency responses of the targets are being synthesized and accumulated in the 2D array.

For each frequency sample of each Tx/Rx channel pair, the dynamic simulation may perform an inverse FFT (IFFT) across the velocity dimension of the 2D array to extrapolate the responses due to all targets forward in time, starting from the center chirp of the CPI and working forward to later chirps. Depending on the amount of velocity bin over-sampling, only a fraction of the post-IFFT results starting at t=0, where t=0 is the center chirp of the CPI, may be needed to fill in the chirp responses for t>=0. For example, if the velocity bin over-sampling is 4× relative to the velocity resolution of the waveform, then only the lower (first) eighth of the post-IFFT results may be needed. The IFFT extrapolation yields the Rx signal response vs. frequency vs. CPI chirps for chirps at t>=0. In one embodiment, the dynamic simulation may perform an IFFT across the velocity dimension to extrapolate the responses due to all targets starting from the first chirp after the center chirp of the CPI. The IFFT extrapolation may then yield the Rx signal response vs. frequency vs. CPI chirps for chirps at t>0.

Similarly, for each frequency sample of each Tx/Rx channel pair, the dynamic simulation may perform an FFT across the velocity dimension of the 2D array to extrapolate the responses due to all targets backward in time, starting from the first chirp before the center chirp of the CPI and working backward to earlier chirps. The FFT extrapolation yields the Rx signal response vs. frequency vs. CPI chirps for chirps at t<0. In one embodiment, the dynamic simulation may perform an FFT across the velocity dimension to extrapolate the responses due to all targets starting from the center chirp of the CPI and working backward to the earlier chirps. The FFT extrapolation may then yield the Rx signal response vs. frequency vs. CPI chirps at t<=0.

The dynamic simulation may obtain the Rx signal response vs. frequency vs. CPI chirp index for each Tx/Rx channel pair for each radar mode. A post-processing operation may perform 2D (I)FFT on the Rx signal responses to obtain a range-Doppler image. In one embodiment, to perform the 2D (I)FFT, the post processing operation may perform a sequence of 1D IFFT operations across frequencies, one for each chirp response, to obtain the Rx signal response vs. range vs. chirp. Then, the post processing operation may perform a sequence of 1D FFT operations across chirps, one for each post-IFFT range response, to obtain the Rx signal response vs. range vs. Doppler velocity. Conversely, in one embodiment, the post processing operation may perform a sequence of 1D FFT operations across chirps, one for each frequency, to obtain the Rx signal response vs. frequency vs. Doppler velocity. Then, the post processing operation may perform a sequence of 1D IFFT operations across frequencies, one for each post-FFT Doppler velocity response, to obtain the Rx signal response vs. range vs. Doppler velocity. In one embodiment, the post-processing operation may process different responses for a group of Rx antennas and/or Tx antennas to yield angle-of-arrival information.

By extrapolating the radar response from the center chirp to all the other chirps of the radar CPI using over-sampled velocity bins and FFT/IFFT operations, the disclosed technique significantly improves the computational efficiency of deploying FF-RRP ROM during dynamic simulation. Embodiments of the disclosure provide significant acceleration over brute-force chirp-by-chirp computation to enable real-time dynamic simulation of radar responses and imagery of targets for closed-loop radar simulation.

Figure 3:
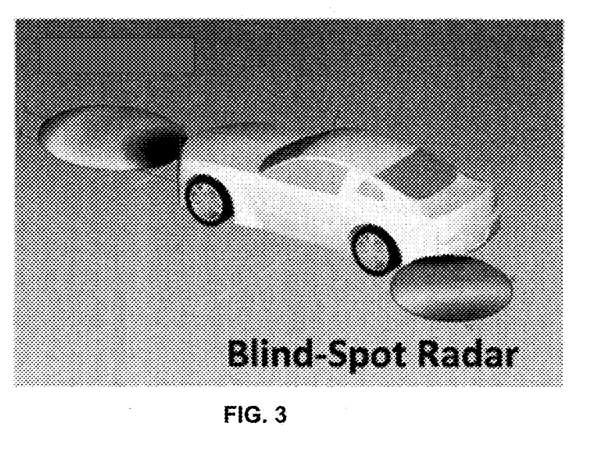
FIG. 3 illustrates a front radar and a blind-spot radar on a vehicle deployed in a simulation to interact with FF-RRP ROM of targets in accordance with one embodiment of the disclosure.

FIG. 3 illustrates a front radar and a blind-spot radar on a vehicle deployed in a simulation to interact with FF-RRP ROM of targets in accordance with one embodiment of the disclosure. The front radar may form a Tx/Rx antenna pair with antenna gains for detecting targets forward of the vehicle. The blind-spot radar may form a second Tx/Rx antenna pair with antenna gains for detecting targets to the rear of the vehicle and in the driver's blind spot. The pre-processing operation of the dynamic simulation may identify the characteristics of the radars such as the polarized 3D antenna patterns, antenna positioning and spacing, transmission power, waveforms, etc.

Figure 4:
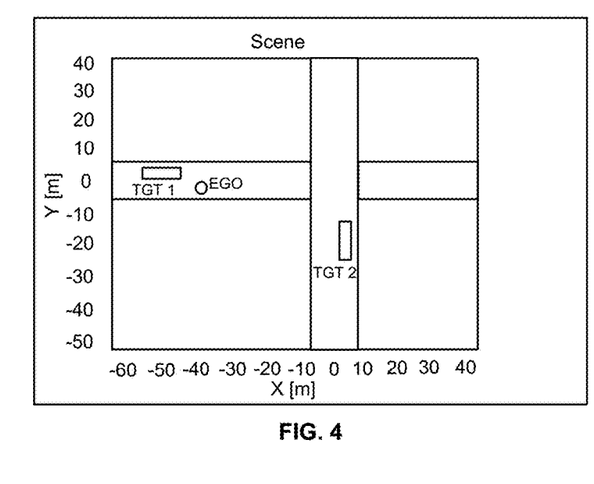
FIG. 4 illustrates a simulation scenario of the radar-bearing vehicle of FIG. 3 and two targets modeled in FF-RRP ROM in accordance with one embodiment of the disclosure.

FIG. 4 illustrates a simulation scenario of the radar-bearing vehicle of FIG. 3 and two targets modeled in FF-RRP ROM in accordance with one embodiment of the disclosure. During the database preparation operation, the FF-RRP ROM of the targets may be modeled as coherent RCS for all four polarization combinations vs. frequency vs. angle at a higher level of abstraction that leaves out the radar's antennas and their particular frequency samplings so that the FF-RRP ROM may be broadly applicable to different radar designs. Synthesizing and storing the target responses as coherent RCS vs. frequency vs. angle retains the distributed time response of the targets and their angular dependence, providing better realism than point scatter models that are more typically used in real-time radar sensor simulation. During the pre-processing operation, the frequency response of the FF-RRP ROM of the targets may be interpolated or re-sampled to match the frequency sampling of each radar in preparation for the deployment of the FF-RRP ROM. In one embodiment, the frequency response of FF-RRP ROM of the targets may be frequency resampled using FFT-based interpolation to match the frequency samples of the radars of the radar-bearing vehicle. FFT-based interpolations of frequency samples avoids the introduction of range (time) artifacts that may degrade the simulation results or the need for higher frequency sampling density, allowing the FF-RRP ROM to be used with a broad range of radars.

Figure 5:
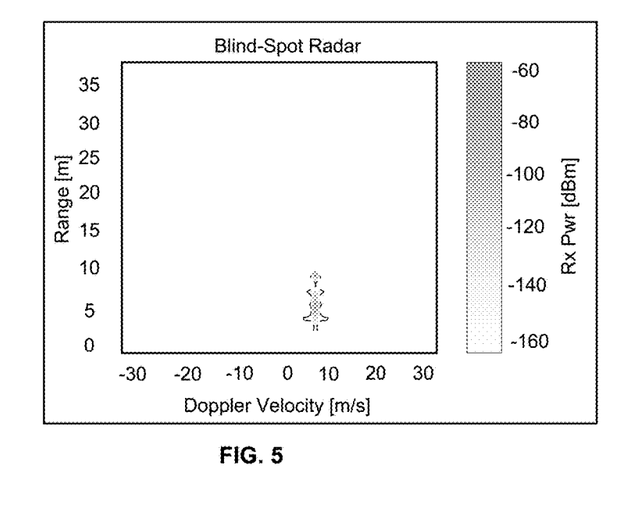
FIG. 5 illustrates the radar response of the targets sensed by the blind-spot radar of the radar-bearing vehicle of FIG. 3 as a function of range and Doppler velocity relative to the radar in accordance with one embodiment of the disclosure.

FIG. 5 illustrates the radar response of the targets sensed by the blind-spot radar of the radar-bearing vehicle of FIG. 3 as a function of range and Doppler velocity relative to the radar in accordance with one embodiment of the disclosure. The range-Doppler image is post-processed from the Rx signal response vs. frequency vs. CPI chirp index for the blind-spot radar extrapolated from the radar response from the center chirp of the radar CPI using over-sampled velocity bins and FFT/IFFT operations.

Figure 6:
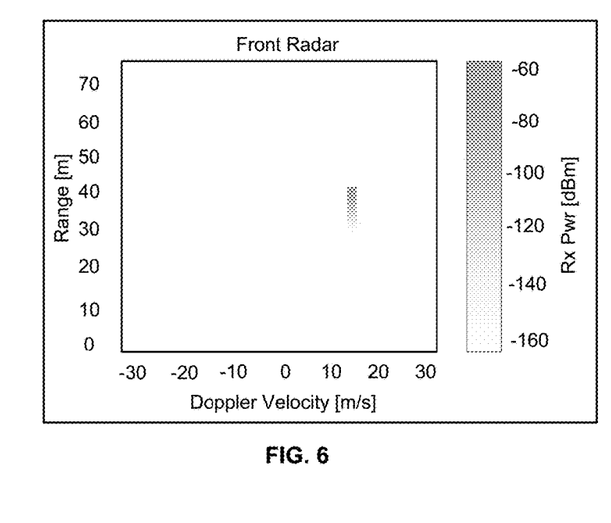
FIG. 6 illustrates the radar response of the targets sensed by the front radar of the radar-bearing vehicle of FIG. 3 as a function of range and Doppler velocity relative to the radar in accordance with one embodiment of the disclosure.

FIG. 6 illustrates the radar response of the targets sensed by the front radar of the radar-bearing vehicle of FIG. 3 as a function of range and Doppler velocity relative to the radar in accordance with one embodiment of the disclosure. The range-Doppler image is post-processed from the Rx signal response vs. frequency vs. CPI chirp index for the front radar extrapolated from the radar response from the center chirp of the radar CPI using over-sampled velocity bins and FFT/IFFT operations.

Figure 7:
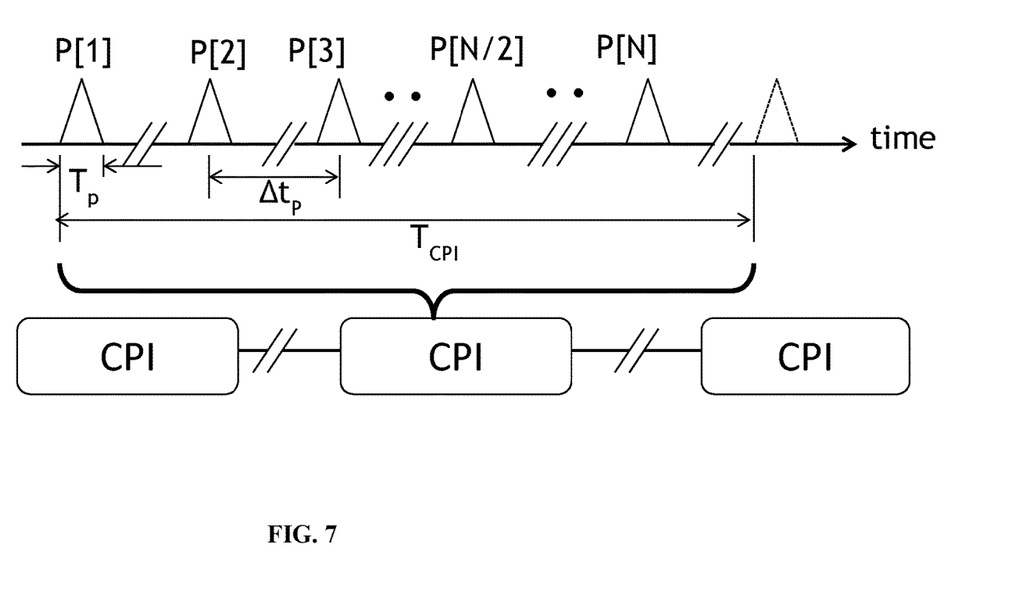
FIG. 7 illustrates a coherent processing interval (CPI) containing a multitude of chirps of a radar in accordance with one embodiment of the disclosure.

FIG. 7 illustrates a coherent processing interval (CPI) containing a multitude of chirps of a radar in accordance with one embodiment of the disclosure. The CPI has N chirps spanning over a CPI interval of $T_{CPI}$. Each chirp has a duration of Tp. The interval between chirps is $\Delta t_p$. The response for the center chirp P[N/2] of the CPI may be stored in over-sampled velocity bins to allow the responses for chirps P[1], P[2] ... P[N/2−1], P[N/2+1] ... P[N] to be extrapolated using FFT/IFFT operations to reduce the computational burden of generating the chirp responses when deploying the FF-RRP ROM during real-time dynamic simulation.

Figure 8:
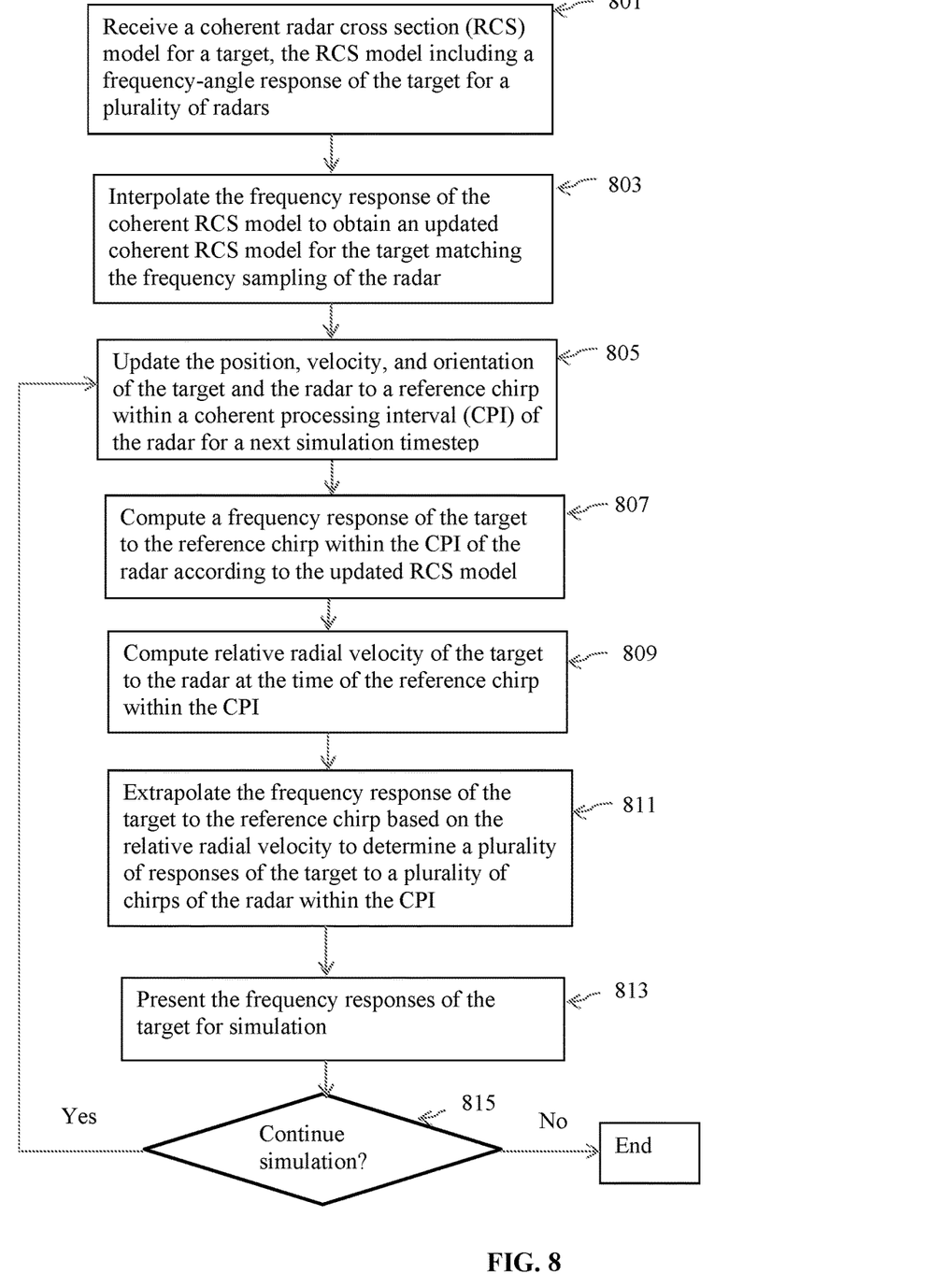
FIG. 8 is a flow diagram of a method to use the FF-RRP ROM database of targets to predict in real-time the frequency responses of the targets during real-time dynamic simulation in accordance with one embodiment of the disclosure.

FIG. 8 is a flow diagram of a method to use the FF-RRP ROM database of targets to predict in real-time the frequency responses of the targets during dynamic simulation in accordance with one embodiment of the disclosure.

In operation 801, the method receives a coherent RCS model for a target. The coherent RCS model includes the frequency-angle response of the target that may be used for different radars. In one embodiment, the coherent RCS model of the target includes an FF-RRP ROM of the target containing the frequency-angle response of the target to a range of frequencies and a range of sweeping angles for all four polarization combinations. In one embodiment, the angle in radar applications refers to an attack angle measured from the target to the radar, which may also be referred to as an aspect angle.

In operation 803, the method interpolates the frequency response of the coherent RCS model to obtain an updated coherent RCS model for the target to match the frequency sampling of a radar. In one embodiment, the frequency resampling is performed using an FFT-based interpolation to increase frequency sampling density without introducing range artifacts.

In operation 805, the method updates the position, velocity, and orientation of the target and the radar according to the time of a reference chirp within a CPI of the radar for a first simulation timestamp. In one embodiment, the reference chirp may be the center chirp of the CPI.

In operation 807, the method computes a frequency response of the target to the reference chirp within the CPI of the radar according to the updated RCS model. In one embodiment, the method may scale the interpolated frequency response obtained from the coherent RCS model of the target according to the Tx antenna vector gain, the Tx radiation power, the distance from Tx antenna to the target, the Rx antenna vector gain, and the distance from Rx antenna to the target. The polarized (vector) gains of the Tx and Rx antennas may be combined with the polarized RCS data for the four polarization combinations (VV, HV, VH, and HH) to yield a scalar frequency response of the target to the center chirp of the radar CPI.

In operation 809, the method computes the radial velocity of the target relative to the radar at the time of the center chirp within the CPI. The relative radial velocity of the target may also be referred to as instantaneous Doppler velocity of the target. In one embodiment, the method accumulates the frequency response of the target to the center chirp of the CPI in an over-sampled velocity bin selected using the instantaneous Doppler velocity of the target.

In operation 811, the method extrapolates the frequency response of the target to the center chirp based on the relative radial velocity to determine a multitude of frequency responses of the target to a multitude of chirps within the CPI of the radar. In one embodiment, the method performs an IFFT and FFT across the velocity dimension for each frequency of the frequency response of the target to the center chirp to extrapolate the responses of the target to all chirps forward and backward in time, respectively, from the center chirp.

In operation 813, the method presents the response of the target for simulation. In one embodiment, the simulation uses the response vs. frequency vs. CPI chirp index of the target to obtain a range-Doppler image of the target in real-time.

In operation 815, a decision is made as whether to continue simulation. If the simulation is to continue, the method returns to operation 805 to update the position, velocity, and orientation of the target and the radar to the reference chirp with the CPI of the radar for the next simulation timestamp. Operations 807, 809, 811, and 813 are then repeated. Otherwise, the simulation stops. In one embodiment, the RCS model preparation of operation 801 and the simulation pre-processing operation carried out in operation 803 may be repeated for multiple targets and radars. Similarly, the portion of dynamic simulation carried out in operations 805, 807, and 809 may be repeated for multiple targets, with responses from multiple targets having been accumulated upon entering operation 811. Similarly, the dynamic simulation carried out in operations 805, 807, 809, 811, and 813 may be repeated for multiple radars.

The methods and systems described herein may be implemented using any suitable processing system with any suitable combination of hardware, software and/or firmware, such as described below with reference to the non-limiting examples of FIGS. 9, 10A, 10B, and 10C.

Figure 9:
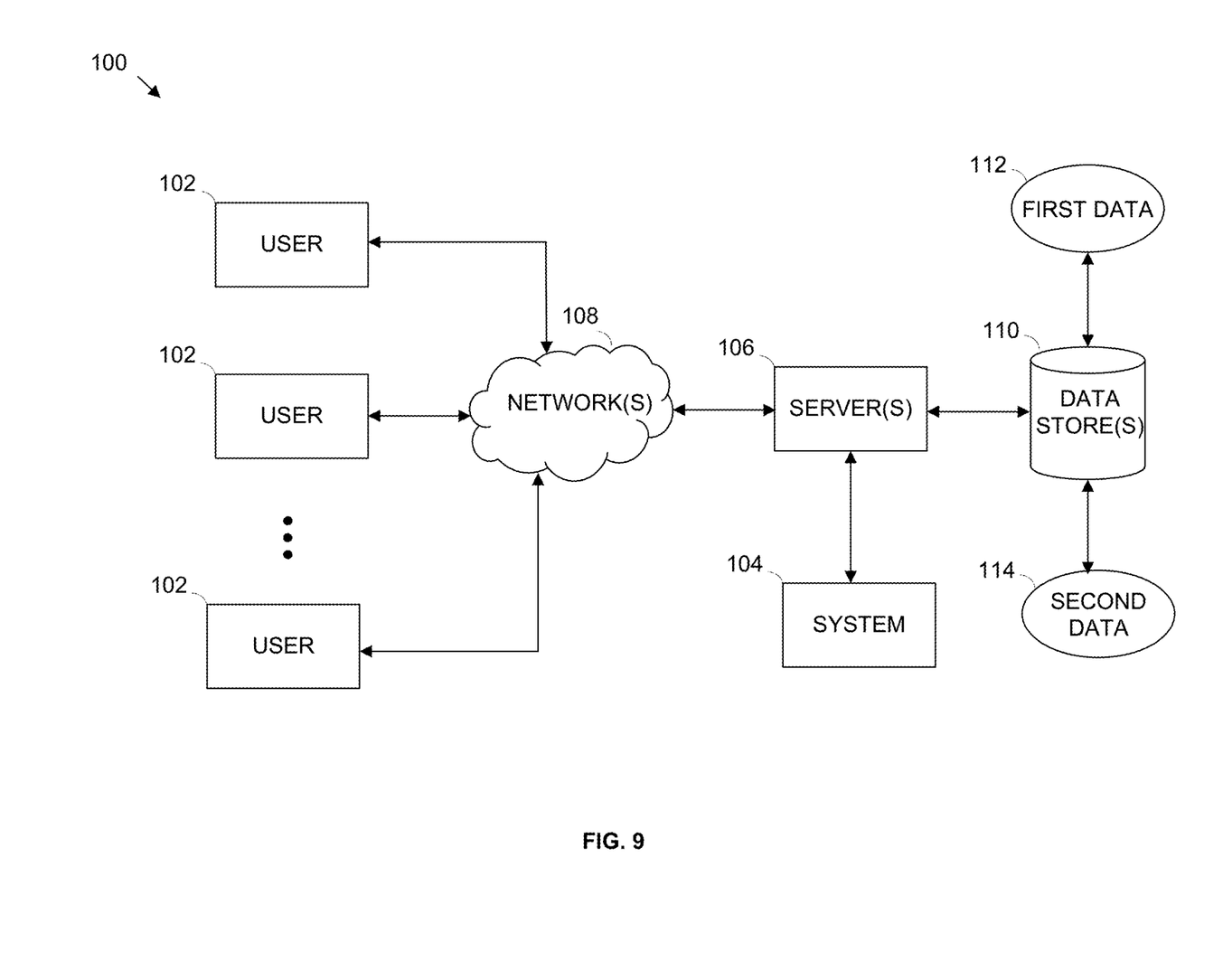
FIGS. 9, 10A, 10B, 10C depict example systems which may be used in conjunction with the embodiments described herein.

FIG. 9 depicts at 100 a computer-implemented environment wherein users 102 can interact with a system 104 hosted on one or more servers 106 through a network 108. The system 104 contains software operations or routines. The users 102 can interact with the system 104 through a number of ways, such as over one or more networks 108. One or more servers 106 accessible through the network(s) 108 can host system 104. It should be understood that the system 104 could also be provided on a stand-alone computer for access by a user.

Figure 10A:
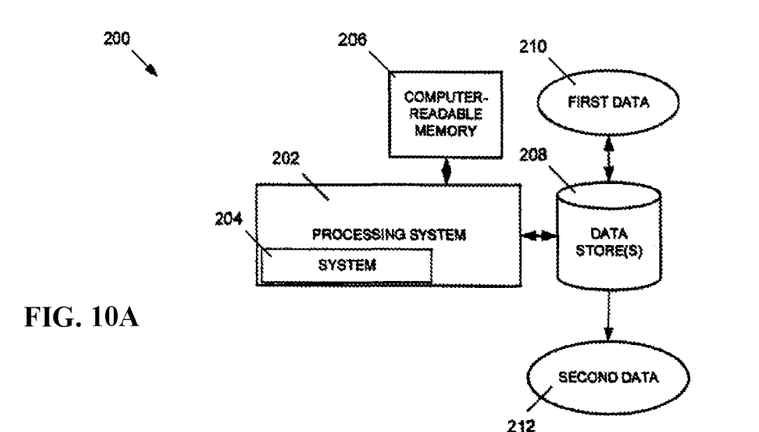
Figure 10B:
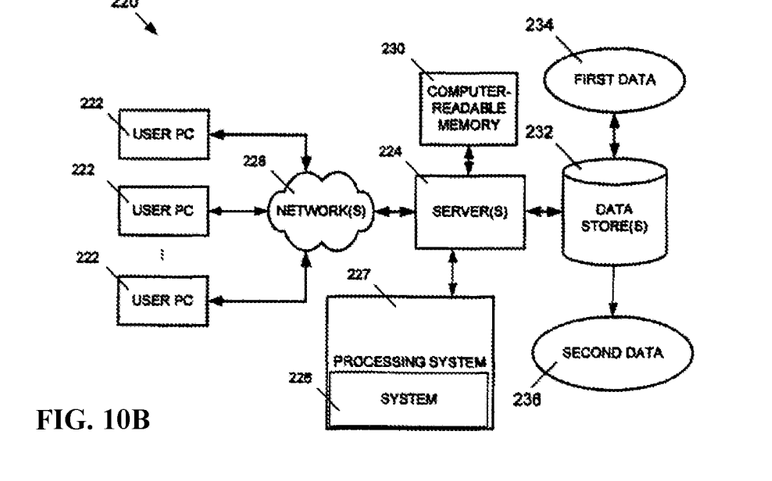
Figure 10C:
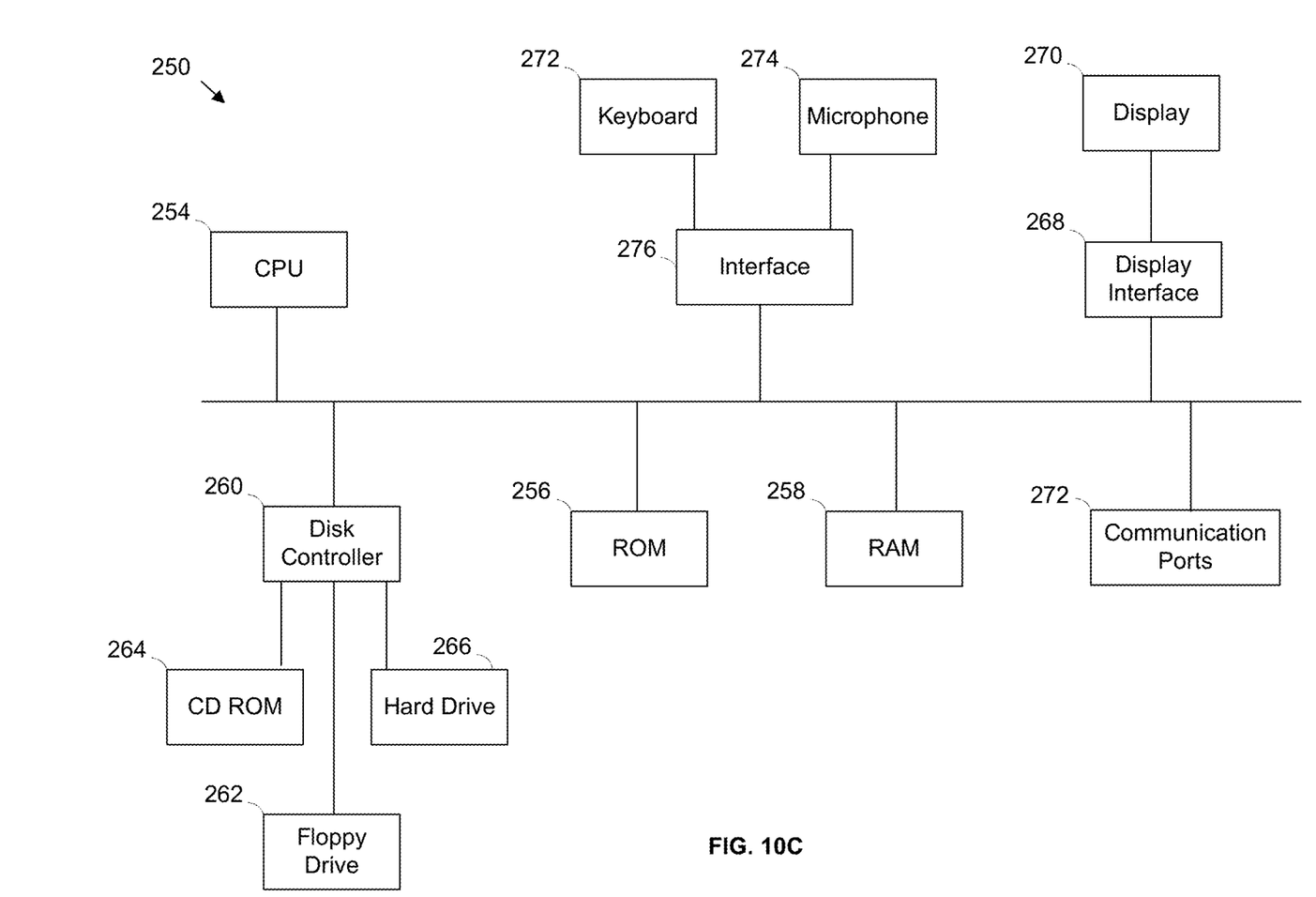

FIGS. 10A, 10B, and 10C depict example systems for use in implementing a system. For example, FIG. 10A depicts an exemplary system 200 that includes a standalone computer architecture where a processing system 202 (e.g., one or more computer processors) includes a system 204 being executed on it. The processing system 202 has access to a non-transitory computer-readable memory 206 in addition to one or more data stores 208. The one or more data stores 208 may contain first data 210 as well as second data 212.

FIG. 10B depicts a system 220 that includes a client server architecture. One or more user PCs 222 accesses one or more servers 224 running a system 226 on a processing system 227 via one or more networks 228. The one or more servers 224 may access a non-transitory computer readable memory 230 as well as one or more data stores 232. The one or more data stores 232 may contain first data 234 as well as second data 236.

FIG. 10C shows a block diagram of exemplary hardware for a standalone computer architecture 250, such as the architecture depicted in FIG. 10A that may be used to contain and/or implement the program instructions of system embodiments of the present disclosure. A bus 252 may serve as the information highway interconnecting the other illustrated components of the hardware. A processing system 254 labeled CPU (central processing unit) (e.g., one or more computer processors), may perform calculations and logic operations required to execute a program. A non-transitory computer-readable storage medium, such as read only memory (ROM) 256 and random access memory (RAM) 258, may be in communication with the processing system 254 and may contain one or more programming instructions. Optionally, program instructions may be stored on a non-transitory computer-readable storage medium such as a magnetic disk, optical disk, recordable memory device, flash memory, or other physical storage medium. Computer instructions may also be communicated via a communications signal, or a modulated carrier wave, e.g., such that the instructions may then be stored on a non-transitory computer-readable storage medium.

A disk controller 260 interfaces one or more optional disk drives to the system bus 252. These disk drives may be external or internal floppy disk drives such as 262, external or internal CD-ROM, CD-R, CD-RW or DVD drives such as 264, or external or internal hard drives 266. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 260, the ROM 256 and/or the RAM 258. Preferably, the processor 254 may access each component as required.

A display interface 268 may permit information from the bus 256 to be displayed on a display 270 in audio, graphic, or alphanumeric format. Communication with external devices may optionally occur using various communication ports 272.

In addition to the standard computer-type components, the hardware may also include data input devices, such as a keyboard 272, or other input device 274, such as a microphone, remote control, pointer, mouse, touchscreen and/or joystick.

This written description describes exemplary embodiments of the disclosure, but other variations fall within scope of the disclosure. For example, the systems and methods may include and utilize data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

The methods and systems described herein may be implemented on many different types of processing devices by program code comprising program instructions that are executable by the device processing system. The software program instructions may include source code, object code, machine code, or any other stored data that is operable to cause a processing system to perform the methods and operations described herein. Any suitable computer languages may be used such as C, C++, Java, etc., as will be appreciated by those skilled in the art. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other non-transitory computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

What is claimed is:

1. A method for a real-time radar simulation, comprising:
receiving a coherent radar cross-section (RCS) model for a target, the coherent RCS model including frequency responses applicable to a plurality of radars;
interpolating the frequency responses of the coherent RCS model to obtain an updated coherent RCS model for the target, the updated coherent RCS model matching a frequency sampling of a radar, wherein the frequency sampling comprises a frequency at which the radar samples a response of the target to the radar;
computing a frequency response of the target to a reference chirp within a coherent processing interval (CPI) of the radar according to the updated coherent RCS model, wherein the CPI comprises a plurality of periodic chirps each having a chirp duration;
computing a radial velocity of the target relative to the radar, wherein the radial velocity comprises a time rate of change in a round-trip path length from a transmit antenna of the radar to the target to a receive antenna of the radar;
extrapolating the frequency response of the target to the reference chirp based on the radial velocity of the target to determine a plurality of frequency responses of the target to a plurality of chirps of the radar within the CPI; and simulating the plurality of frequency responses of the target in real-time to represent an imagery of the target.

2. The method of claim 1, wherein the interpolating the frequency responses of the coherent RCS model to obtain an updated coherent RCS model for the target comprises interpolating the frequency responses to match the frequency sampling of the radar using a fast Fourier Transform (FFT)-based operation.

3. The method of claim 1, wherein the computing a frequency response of the target to a reference chirp comprises:

updating a position, an orientation, and a velocity of the target at a time corresponding to the reference chirp;

updating a position, an orientation, and a velocity of the radar at the time corresponding to the reference chirp;

determining characteristics of the radar; and determining the frequency response of the target to the reference chirp based on the position, the orientation, and the velocity of the target corresponding to the reference chirp, the position, the orientation, and the velocity of the radar corresponding to the reference chirp, the characteristics of the radar, and the updated coherent RCS model.

4. The method of claim 1, wherein the computing a radial velocity of the target relative to the radar comprises computing the radial velocity of the target relative to the radar at a time corresponding to the reference chirp.

5. The method of claim 1, further comprising:

accumulating the frequency response of the target to the reference chirp into one or more velocity bins that correspond to the radial velocity of the target relative to the radar, wherein the frequency response of the target is distributed across a velocity dimension that includes the one or more velocity bins.

6. The method of claim 5, wherein a resolution of the velocity dimension used to distribute the frequency response of the target is finer relative to a Doppler velocity resolution based on the CPI of the radar.

7. The method of claim 5, wherein the extrapolating the frequency response of the target to the reference chirp based on the radial velocity of the target to determine a plurality of frequency responses of the target to a plurality of chirps of the radar within the CPI comprises:

performing an inverse fast Fourier Transform (IFFT) of the frequency response across the velocity dimension to extrapolate the frequency response of the target forward in time starting from the reference chirp to a plurality of chirps after the reference chirp within the CPI.

8. The method of claim 5, wherein the extrapolating the frequency response of the target to the reference chirp based on the radial velocity of the target to determine a plurality of frequency responses of the target to a plurality of chirps of the radar within the CPI comprises:

performing a fast Fourier Transform (FFT) of the frequency response across the velocity dimension to extrapolate the frequency response of the target backward in time starting from the reference chirp to a plurality of chirps before the reference chirp within the CPI.

9. A system, comprising:
a processor; and a memory coupled to the processor to store instructions, which when executed by the processor, cause the processor to perform operations, the operations comprising:

receiving a coherent radar cross-section (RCS) model for a target, the coherent RCS model including frequency responses applicable to a plurality of radars;

interpolating the frequency responses of the coherent RCS model to obtain an updated coherent RCS model for the target, the updated coherent RCS model matching a frequency sampling of a radar, wherein the frequency sampling comprises a frequency at which the radar samples a response of the target to the radar;

computing a frequency response of the target to a reference chirp within a coherent processing interval (CPI) of the radar according to the updated coherent RCS model, wherein the CPI comprises a plurality of periodic chirps each having a chirp duration;

computing a radial velocity of the target relative to the radar, wherein the radial velocity comprises a time rate of change in a round-trip path length from a transmit antenna of the radar to the target to a receive antenna of the radar;

extrapolating the frequency response of the target to the reference chirp based on the radial velocity of the target to determine a plurality of frequency responses of the target to a plurality of chirps of the radar within the CPI; and simulating the plurality of frequency responses of the target in real-time to represent an imagery of the target.

10. The system of claim 9, wherein the processor interpolating the frequency responses of the coherent RCS model to obtain an updated coherent RCS model for the target comprises the processor:

interpolating the frequency responses to match the frequency sampling of the radar using a fast Fourier Transform (FFT)-based operation.

11. The system of claim 9, wherein the processor executes the instructions to further perform operations that comprise:

accumulating the frequency response of the target to the reference chirp into one or more velocity bins that correspond to the radial velocity of the target relative to the radar, wherein the frequency response of the target is distributed across a velocity dimension that includes the one or more velocity bins.

12. The system of claim 11, wherein the processor extrapolating the frequency response of the target to the reference chirp based on the radial velocity of the target to determine a plurality of frequency responses of the target to a plurality of chirps of the radar within the CPI comprises the processor:

performing an inverse fast Fourier Transform (IFFT) of the frequency response across the velocity dimension to extrapolate the frequency response of the target forward in time starting from the reference chirp to a plurality of chirps after the reference chirp within the CPI.

13. The system of claim 11, wherein the processor extrapolating the frequency response of the target to the reference chirp based on the radial velocity of the target to determine a plurality of frequency responses of the target to a plurality of chirps of the radar within the CPI comprises the processor:

performing a fast Fourier Transform (FFT) of the frequency response across the velocity dimension to extrapolate the frequency response of the target backward in time starting from the reference chirp to a plurality of chirps before the reference chirp within the CPI.

14. A non-transitory computer-readable medium having instructions stored therein, which when executed by a processor, cause the processor to perform operations, the operations comprising:

receiving a coherent radar cross-section (RCS) model for a target, the coherent RCS model including frequency responses applicable to a plurality of radars;

interpolating the frequency responses of the coherent RCS model to obtain an updated coherent RCS model for the target, the updated coherent RCS model matching a frequency sampling of a radar, wherein the frequency sampling comprises a frequency at which the radar samples a response of the target to the radar;

computing a frequency response of the target to a reference chirp within a coherent processing interval (CPI) of the radar according to the updated coherent RCS model, wherein the CPI comprises a plurality of periodic chirps each having a chirp duration;

computing a radial velocity of the target relative to the radar, wherein the radial velocity comprises a time rate of change in a round-trip path length from a transmit antenna of the radar to the target to a receive antenna of the radar;

extrapolating the frequency response of the target to the reference chirp based on the radial velocity of the target to determine a plurality of frequency responses of the target to a plurality of chirps of the radar within the CPI; and simulating the plurality of frequency responses of the target in real-time to represent an imagery of the target.

15. The non-transitory computer-readable medium of claim 14, wherein the operation of interpolating the frequency responses of the coherent RCS model to obtain an updated coherent RCS model for the target comprises:

interpolating the frequency responses to match the frequency sampling of the radar using a fast Fourier Transform (FFT)-based operation.

16. The non-transitory computer-readable medium of claim 14, wherein the instructions when executed by the processor cause the processor to perform operations that further comprise:

accumulating the frequency response of the target to the reference chirp into one or more velocity bins that correspond to the radial velocity of the target relative to the radar, wherein the frequency response of the target is distributed across a velocity dimension that includes the one or more velocity bins.

17. The non-transitory computer-readable medium of claim 16, wherein the operation of extrapolating the frequency response of the target to the reference chirp based on the radial velocity of the target to determine a plurality of frequency responses of the target to a plurality of chirps of the radar within the CPI comprises:

performing an inverse fast Fourier Transform (IFFT) of the frequency response across the velocity dimension to extrapolate the frequency response of the target forward in time starting from the reference chirp to a plurality of chirps after the reference chirp within the CPI.

18. The non-transitory computer-readable medium of claim 16, wherein the operation of extrapolating the frequency response of the target to the reference chirp based on the radial velocity of the target to determine a plurality of frequency responses of the target to a plurality of chirps of the radar within the CPI comprises:

performing a fast Fourier Transform (FFT) of the frequency response across the velocity dimension to extrapolate the frequency response of the target backward in time starting from the reference chirp to a plurality of chirps before the reference chirp within the CPI.

* * * * *